3,471,623
METHOD OF COMBATTING PESTS WITH
FLUORINATED PERHALOCYCLIC KETONE
Louis G. Anello, Basking Ridge, Richard F. Sweeney,
Dover, and Alson K. Price, Mine Hill, N.J., assignors
to Allied Chemical Comporation, New York, N.Y., a
corporation of New York
No Drawing. Filed July 5, 1966, Ser. No. 562,510
Int. Cl. A01n 17/00, 9/24; C07c 49/30
U.S. Cl. 424—331                                    4 Claims

ABSTRACT OF THE DISCLOSURE

Process for combatting noxious pest organisms comprising treating the locus of the pests with an effective amount of a compound of the formula:

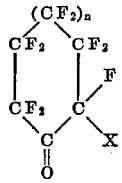

wherein $n$ is an integer of 0 to 1 and X is a halogen selected from the group consisting of fluorine and chlorine.

---

This invention relates to use of certain fluorinated perhalocyclic ketones as fumigants and, more particularly, to a process for combatting noxious pest organisms.

Control of pest organisms which infest various hosts such as grain, fruits, vegetables, soil, textiles and the like is extremely difficult, particularly in those cases where the pest organisms penetrate deeply into the interior of the host space. In such cases, the effectiveness of surface poisons or pesticides is seriously impaired because of the difficulty in reaching the interior of the space. Although various fumigants have been proposed for controlling such pests, there is a need for new and highly effective fumigants.

Accordingly, it is an object of the present invention to provide a method of combatting pests, including insects and nematodes, by subjecting said pests to the action of a pesticide which is capable of thoroughly permeating the host space and capable of exterminating all forms of the pest population.

It has now been discovered that certain fluorinated perhalocyclic ketones are outstanding fumigants exerting extremely lethal effects against common penetrating pests such as those infesting plants, plant parts, soil, grain, flour, rugs, etc. The fluorinated perhalocyclic ketone fumigants of this invention are volatile liquids and may be represented by the formula:

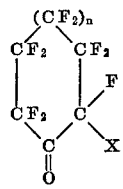

wherein $n$ is an integer of 0 to 1 and X is a halogen such as fluorine or chlorine. Typical compounds of this invention include octafluorocyclopentanone, decafluorocyclohexanone, 2-chloroheptafluorocyclopentanone and 2-chlorononafluorocyclohexanone.

The perfluorocyclic ketones of this invention may be prepared by reacting the corresponding 2,2-dichloroperfluorocyclic ketones with an inorganic metal fluoride, such as potassium fluoride, in an inert polar solvent as is disclosed and claimed in the copending application of Louis G. Anello and Richard F. Sweeney, Ser. No. 427,-484 filed Jan. 22, 1965, now U.S. Patent 3,379,765.

The 2-chloroperfluorocyclic ketones of this invention may be prepared by reaction of a 1,2-dichloroperfluorocyclic epoxide with an inorganic metal fluoride such as potassium fluoride in the presence of an inert polar solvent as is described and claimed in copending application Ser. No. 455,580 filed May 13, 1965 of Alson K. Price and Richard F. Sweeney, now U.S. Patent 3,350,457.

In the process of the present invention, control of many noxious pests, including insects and nematodes, can be effected by treating the locus of the pests, i.e., the pests themselves, their environment, their food or their host, such as insect and/or nematode infested plants, soils, grains, flour, etc., with an effective amount of the fluorinated perhalocyclic ketone fumigants of the invention. Although the process is particularly effective for control of grain infesting insects, such as the various meal worms and flour beetles, and soil-inhabiting nematodes, other pests such as mites, flies, roaches, etc., may likewise be controlled thereby. The pests combatted may be in adult, nymph, larval or egg form.

The pests are subjected to a toxic concentration of the fluorinated perahocyclic ketone according to well established methods known in the art. These toxicants may be applied to the locus "as is" or in a variety of pesticidal compositions. The nature of these compositions will depend primarily on the particular composition contemplated. If desired, the toxicant can be supplied in the form of a spray employing solutions or emulsions of the toxicant in organic solvents. Carbon tetrachloride, perchloroethylene, chloroform and deodorized oils such as kerosene, xylene and methylated naphthalenes are illustrative organic solvents employable. According to a typical method, the toxicant is contacted with the locus of the pests in such manner that it is free to volatize and permeate the atmosphere.

When the fluorinated perhalocyclic ketone fumigants of the present invention are employed to combat insects inhabiting an enclosed space, a dosage of at least about $6 \times 10^{-4}$, preferably $2.5 \times 10^{-3}$, pounds of the toxicant per 1,000 cubic feet of enclosed space is generally adequate to saturate the area and to ensure effective control of the insects. The exposure time required depends upon the size of the enclosed area and the type of host, e.g., flour or grain, in the area. In an area of 1,000 cubic feet, the time normally required for most effective fumigation at a dosage between about $6 \times 10^{-4}$ and $2.5 \times 10^{-3}$ pounds is about from 24 to about 96 hours.

As was previously indicated, the fluorinated perhalocyclic ketones described above may also be used for controlling soil-inhabiting nematodes in either pre-emergence or post-emergence treatments. These compositions may be applied to the nematode infested soil in any conventional manner as by spraying, drenching or dusting. The term "soil" as used herein is intended to include any medium capable of supporting growth of plants. It is therefore intended to include, in addition to soil, humus, manure, compost, sand and artificial plant growth medium including hydroponic media. When used as a nematocide, the fluorinated perhalocyclic ketones are generally effective when distributed in the infested soil at a dosage of at least 10 pounds per acre and preferably at least about 50 pounds per acre.

The effectiveness of the typical fluorinated perhalocyclic ketones of the invention as fumigants is illustrated by the tests described in the following examples.

EXAMPLE 1

Decafluorocyclohexanone and 2-chlorononafluorocyclohexanone were tested as fumigants against black carpet beetle larvae (*Attagenus piceus*), confused flour beetle adults (*Tribolium confusum*) and lesser meal worm larvae (*Alphitobius diaperimus*). All tests were run under substantially identical conditions. In conducting these tests, tins having perforated lids and containing the insects and small amounts of appropriate food such as grain or flour were placed in gallon mason jars. The toxicant was introduced onto a cellucotton wad placed in the jars in such quantities to give a concentration of vapor in the jar indicated in Table I below. The jars were sealed and the insects exposed to the toxicants for predetermined time periods. The insect controls were removed and organisms then examined for percent mortality. Results of these tests are set forth in Table I below:

TABLE I

| Compound | Dosage, cc./gal. | Percent mortality | | |
|---|---|---|---|---|
| | | Confused flour beetle adults | Lesser meal worm larvae | Black carpet beetle larvae |
| 2-chlorononafluorocyclohexanone | 0.1 | [1] 100 | [1] 60 | [1] 100 |
| Do | 0.025 | | | [2] 100 |
| Decafluorocyclohexanone | 0.1 | [2] 100 | [3] 100 | [3] 100 |
| Control | | 0 | 0 | 0 |

[1] Results recorded after 3 days of exposure.
[2] Results recorded after 1 day of exposure.
[3] Results recorded after 4 days of exposure.

EXAMPLE 2

Octafluorocyclopentanone, decafluorocyclohexanone, and 2-chlorononafluorocyclohexanone were tested as fumigants against nematodes (*Panagrellus redivivus*) by placing a concentration of toxicant compound indicated in Table II below on a cellucotton wad in a gallon mason jar. Small open petri dishes containing 100+ nematodes in 5 ml. of distilled water were placed in a gallon jar and the jar was sealed. After 24 hours' exposure the nematode controls were removed and examined for percent kill with results shown in Table II below:

TABLE II

| Compound | Dosage (cc./gal.) | Percent mortality |
|---|---|---|
| 2-chlorononafluorocyclohexanone | 0.1 | 100 |
| Do | 0.25 | 90 |
| Decafluorocyclohexanone | 0.1 | 100 |
| Octafluorocyclopentanone | 0.1 | 100 |
| Control | | 0 |

While in the foregoing specification this invention has been described in relation to certain specific embodiments thereof and details have been set forth for the purpose of illustration, it will be apparent to those skilled in the art that the invention is adaptable to other embodiments and many of the details set forth herein can be varied considerably without departing from the basic concept of the invention.

We claim:

1. A process for combatting pests selected from the group consisting of insects, nematodes and mites which comprises subjecting the locus of the pests to an effective amount of a compound of the formula:

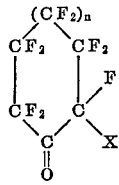

wherein $n$ is an integer of 0 to 1 and X is a halogen selected from the group consisting of fluorine and chlorine.

2. The process of claim 1 wherein the compound is octafluorocyclopentanone.

3. The process of claim 1 wherein the compound is decafluorocyclohexanone.

4. The process of claim 1 wherein the compound is 2-chlorononafluorocyclohexanone.

References Cited

UNITED STATES PATENTS 3,321,515  5/1967  Moore et al. _____ 260—586 XR
3,333,002  7/1967  Sweeney et al. __ 424—331 XR ALBERT T. MEYERS, Primary Examiner
D. R. MAHANAND, Assistant Examiner U.S. Cl. X.R.
260—586